United States Patent [19]

Roz et al.

[11] Patent Number: 4,894,154

[45] Date of Patent: Jan. 16, 1990

[54] INDIVIDUAL PORTABLE WATER-TREATMENT DEVICE

[75] Inventors: Bernard Roz, Briis Sous Forge; Jacques Andre, Sainte Genevieve des Bois, both of France

[73] Assignee: Societe de Recherche Techniques et Industrielles (SRTI), Buc, France

[21] Appl. No.: 206,728

[22] Filed: Jun. 15, 1988

[30] Foreign Application Priority Data

Jun. 19, 1987 [FR] France ............................... 87 08657

[51] Int. Cl.$^4$ .............................................. C02F 9/00
[52] U.S. Cl. .................................... 210/266; 210/282; 210/290; 210/436

[58] Field of Search ................ 210/259, 266, 282–284, 210/287, 289, 290, 900, 436

[56] References Cited

U.S. PATENT DOCUMENTS 4,358,376  11/1982  Moriuchi et al. .................... 210/282
4,595,500   6/1986  Galbiati ............................... 210/266

Primary Examiner—Ivars Cintins
Attorney, Agent, or Firm—Oblon, Spivak, McClelland, Maier & Neustadt

[57] ABSTRACT

The water filtering device of the invention comprises a cartridge for filtering suspended materials, an active carbon charge, a charge of anion and cation exchanging resins and a bacteria filtering cartridge.

14 Claims, 1 Drawing Sheet

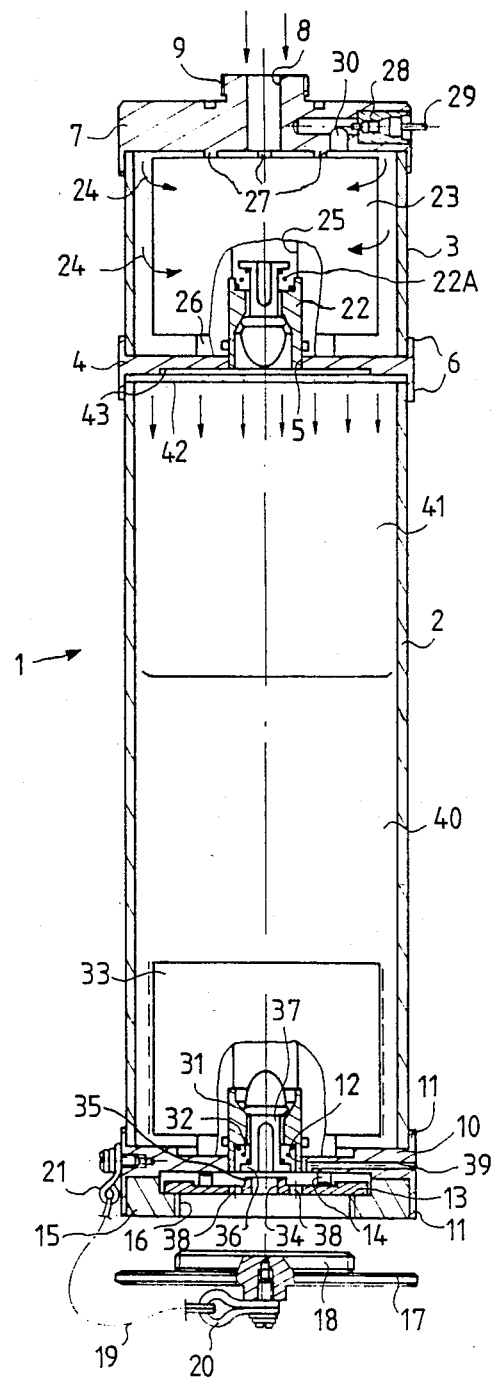

INDIVIDUAL PORTABLE WATER-TREATMENT DEVICE

BACKGROUND OF THE INVENTION

1. Field of the Invention

The present invention relates to an individual portable water-treatment device.

2. Description of the Prior Art

There are known devices for the treatment of highly polluted water, used to filter suspended matter, bacteria and organic and mineral matter, but these devices are heavy and bulky and are, therefore, unsuitable for individual use requiring constant transportation as, for example, in the case of travellers moving around with the minimum luggage possible in tropical countries or that of military personnel on the battlefield.

Furthermore, there are also individual, portable water-treatment devices of the "filtering candle" type, suitable for eliminating micro-organisms, but these devices are fragile and hardly eliminate the mineral salts or organic materials dissolved in the water to be filtered.

An object of the present invention is a water-treatment device which is easily portable and can be used to eliminate suspended matter, micro-organisms as well as dissolved organic and mineral matter from the treated water. Another object of the invention is a water-treatment device which almost immediately has effect at its maximum efficiency and which can retain this maximum efficiency during a long period of use, even after it has been stored for a long time.

SUMMARY OF THE INVENTION

The water-treatment device according to the invention comprises a first filtering device, essentially for the filtering of suspended matter, a charge of absorbent, a charge of ion exchangers and a second filtering device, essentially for filtering micro-organisms. These components are placed in a closed cylindrical enclosure comprising, at one end, an inlet of water to be treated and, and at its other end, a outlet for treated water, said other end for the outlet of treated water being closed imperviously during off periods, the first filtering device being placed in a chamber of the enclosure separated from the rest of the enclosure or body of the enclosure, containing the charges and the second filtering device, by a partition wall fixed to the body and closed imperviously during off periods.

The first and second filtering devices have pleated-membrane filtering cartridges. Preferably, the filtering cartridge of the second filtering device has two superimposed filtering membranes with different porosity values.

The charge of absorbent and the charge of ion exchangers advantageously have a volume ratio of 1:1 with respect to each other. The ion exchangers have substantially equal volumes of anion exchanging resins and cation exchanging resins.

The outlet end of the treatment device opens when a receptacle that collects the treated water is fixed to it. According to an advantageous embodiment, this end is closed by a valve which is normally kept closed by a spring and opens under water pressure, in its vicinity, of about 30 to 50 mbars.

The partition wall between the chamber containing the first filtering device of the body of the enclosure has a recess on the charge side, and is followed by a pad of permeable material which entirely covers the recess.

According to an advantageous feature of the invention, the enclosure is filled with absorbents and ion exchangers before the partition wall is fixed to the body of the enclosure designed to contain these products. This filling is done by pouring, into this body, firstly purified water and then these products, so that they are entirely covered with water.

Advantageously, the unnecessary water in the body of the enclosure is driven out with $CO_2$ after the enclosure has been filled with said absorbent and exchangers, and after the other elements of the treatment device have been fixed.

According to another advantageous characteristic of the invention, the finished treatment device is sterilized by being subjected to beta or gamma radiation of about 1 to 3 Mrad.

BRIEF DESCRIPTION OF THE DRAWING

The present invention will be better understood from the following detailed description of the embodiment, taken as a non-restrictive example and illustrated by the appended drawing with a single figure showing a longitudinal section of a water-treatment device according to the invention.

DESCRIPTION OF A PREFERRED EMBODIMENT

The water-treatment device 1 shown in the drawing has a general cylindrical shape with a circular section. It has essentially a body 2, occupying the greater part of its length, said body 2 being surmounted by a chamber 3 having the same external diameter. The length of the body 2 is about three to four times that of the chamber 3. The body 2 and the chamber 3 are separated by a partition wall 4. The partition wall 4 has the shape of a disk pierced with a central hole 5 and provided with a cylindrically shaped shoulder 6 which extends over a small distance on either side of the disk. The internal diameter of this shoulder 6 is practically equal to the external diameter of the body 2 and the chamber 3. The elements 2 and 3 are joined to the partition wall 4 so as to be imperviously fitted to it, for example by bonding.

The chamber 3 is closed by a cap 7 which is fixed imperviously to it, for example by bonding. The cap 7 is pierced with a central hole 8 for the inlet of water to be purified. The cap 7 has, on its flat external surface, a boss 9 which is coaxial with the hole 8, the external diameter of this boss being greater than the diameter of the hole 8. This boss is used to fix an appropriate pump (not shown), for example a bellows pump, a syringe or a peristaltic pump.

The body 2 is enclosed, at its end opposite to the end to which the partition wall 4 is fixed, by a second partition wall 10 comprising a cylindrical shoulder 11 that extends on either side of the partition wall. The internal diameter of the shoulder 11 is practically equal to the external diameter of the body 2 to which it is fixed imperviously, for example by bonding. The partition wall 10 is drilled with a central hole 12.

In the external part (the part which is not fixed to the body 2) of the shoulder 11, there is an intermediate movable washer 13, which is kept at a distance from the external side of the partition wall 10 by elastic washer 14 (of the Onduflex type for example). The clearance of the thrusting washer 13 is limited by a holding plate 15 imperviously fixed to the shoulder 11, for example by bonding.

The intermediate washer 13 has a diameter of an intermediate value between the internal diameter of the shoulder 11 and the external diameter of the neck of the receptacle (not shown), designed to receive water treated by the device 1. This neck is threaded externally and is screwed into the threaded, central hole 16 of the plate 15. When this receptacle is not there, the output of the device 1 is closed with an closing plate 17 having a threaded boss 18 with a diameter corresponding to the that of the hole 16. The plate 17 is connected to the partition wall 10 by means of a small chain 19 that enters the eyelets 20, 21 which are respectively fixed to the plate 17 and the partition wall 10.

A cylindrical valve 22, placed axially in the chamber 3, is fixed imperviously, for example by force fitting, in the hole 5 of the partition wall 4. This valve 22 which is normally kept closed by a spring 22A, is such that it opens under the effect of water pressure of about 30 to 50 mbars prevailing in its vicinity in the chamber 3.

The cylindrical filter 23, which is advantageously of the pleated membrane type (for example an SARTO-PURE GF minicartridge, made by SARTORIUS, with a membrane having a porosity of 0.2 $\mu$m approximately), is placed in the chamber 3. The relative dimensions of this filter and of the chamber are such that there remains sufficient space between the edge of this filter and the inner side of the chamber 3, and between the upper side of the filter 2 and the lower side of the cap 7, in order to provide a proper flow of the water to be treated, which comes through the hole 8 and goes towards the pleated membrane of the filter placed on its edge (arrows 24). The filter 23 has an axial duct 25. The valve 22 is adapted to the shape and dimensions of this axial duct 25 so that the water coming in the direction of the arrows 25, filtered for a first time by the membrane of this filter, goes through this valve. Of course, the duct 25 is closed at its upper part so that only filtered water penetrates it. The base 26 of the filter 23 is attached imperviously to the partition wall 6 through stubs 27 provided on the lower side of the cap 7, the length of these stubs 27 being such that they are firmly pressed against the upper, rigid side of the filter 23 when the cap 7 is fixed to the chamber 3.

On the cap 7, there is placed a discharging device 28 with a spring valve provided with a pushbutton 29 which can be reached from the outside.

This discharging device 28 makes the inside of the chamber 3 communicate with the outside, through a passage 30 pierced in the cap 7, when the button 29 is pressed. The discharging is done when water starts being pumped to drive out the air contained in the chamber 3, so that the arriving water wets the entire surface of the membrane of the filter 3, giving it optimum efficiency.

A valve 31 is fixed imperviously into the hole 12 of the partition wall 11. This valve 31 may be identical to the valve 22. The valve 31, which is normally kept closed by a spring 32, is such that it opens under the effect of water pressure of about 30 to 50 mbars in its vicinity in the body 2. A filter 33, with substantially the same size and shape as the filter 23, caps the valve 31. The filter 33 is advantageously of the pleated two-membrane type, these two membranes having different porosity values. The filter used is, for example, a SARTORIUS filter of the SARTOBRAN type with superimposed membranes having respective porosity values of 0.8 and 0.2 $\mu$m, thus making it possible to hold back micro-organisms with dimensions of about 0.1 $\mu$m.

The movable washer 13, which has a central hole 34, has a ring-shaped boss 35 which is coaxial to this hole and faces the partition wall 10. The external diameter of this boss corresponds substantially to the external diameter of the base 36 of the movable core 37 of the valve 31. The height of the boss 35 is such that, when there is no receptacle to collect the treated water (with the washer 13 applied by the spring 14 against the plate 15) this boss is not in contact with the base 36 while, when this receptacle is properly fixed to the device 1, this boss pushes the base 36 to open the valve 31 completely. To ensure the passage of treated water going through the valve 31, the washer 13 has several holes 38.

To enable the elimination of air contained in the said receptacle as and when it is filled with treated water, a hole 39 is pierced in the partition wall 10. This hole 39 has a radial part that opens outwards, and a part parallel to the axis of the device 1 that opens out near the valve 31 in front of the washer 13.

This hole 39 is also used to remove water that overflows from the receptacle.

The body 2 is filled with exchanging and absorbent materials as follows (before the partition wall 4 and the chamber 3 are fixed to this body). With the filter 33 fixed in position (the clearance between the external diameter of the valve 31 and the diameter of the duct of the filter 33 is such that the filter is force-fitted to the valve so as to properly kept in position), the body 2 is filled with purified water and, into this water, first of all, intimately mixed anion and cation (40) exchanging materials (for example, resins produced by the BAYER firm, under the brand name LEWATIT, mixed in volume proportions of 1.5:1) are poured in until their level goes up to slightly more than half the distance between the upper side of the filter 33 and the upper side of the body 2. Then, an absorbent material (41), such as active carbon, in the form of grains, is poured into the body 2 up to the level of the upper edge of this body 2. The ratio, by volume, of absorbent to exchangers is advantageously 1:1.

To keep these materials properly in position, and especially to distribute the water to be treated, coming from the valve 22, throughout the section of the body 2, a washer 42 made of a permeable material, for example made of polypropylene, is placed on the shoulder of the body 2. The washer 42 has a diameter which is substantially equal to the external diameter of the body 2 which it caps, and has a thickness of about 1 to 2 mm. In order that the water to be filtered, coming through the valve 22, can be distributed over the greater part of the surface of the washer 42, a circular recess 43, with a depth of about 1 mm. and a diameter slightly smaller than the internal diameter of the body 2, is made in the lower side (the side turned towards the body 2) of the partition wall 4.

Thus, when the body 2 has been filled, firstly with the materials 40 and then with the materials 41, they are levelled out (the remaining purified water also comes to the same level so that all the particles of these materials are properly wet), the washer 42 is positioned and the partition wall 4 is put into place, followed by the chamber 3 and its cap 7, the partition wall 4 being pressed against the washer 42.

If it is desired to reduce the weight of the device 1, the excess purified water can be driven into the body 2. For, to ensure optimum functioning of the materials 40 and 41, it is enough for them to be simply humidified without its being necessary for them to be plunged into water. Depending on the materials used, it is enough for them to have a humidity level of about 40% to 60% by weight. To achieve a humidity level of this kind, the excess water is driven out by injecting a gas such as $CO_2$, under pressure of about 100 to 500 mbars, through the hole 8, while weighing the device during these operations. As soon as the device 1 starts working, the $CO_2$ will dissolve in the water to be treated and the water to be purified will be in normal contact with the materials 40 and 41.

If the body 2 were to be filled with the materials 40 and 41 when dry, the water to be filtered by these materials would flow through preferred passages, at least when this water started arriving, and these materials would be capable of fulfilling their function satisfactorily only after a relatively long period, when all the particles of these materials are wet. On the contrary, filling by "the wet method" according to the invention, as described above, gives the device immediate maximum efficiency.

The following are functions, known per se , of the various elements of the treatment device of the invention.

The filter 23 filters chiefly the suspended materials.

The materials 40 and 41 retain the organic materials and mineral materials dissolved in the water to be treated.

The filter 33 retains chiefly micro-organisms. Through the preliminary filter 23, there is no risk that the largest suspended particles will dirty the absorbents, the ion exchangers and the filter 33 which can perform its role in an optimum way. Furthermore, the fact that the filter 33 is placed at the end of the treatment operation prevents micro-organisms from rising up again through the outlet of the device 1. The valves 22 and 31 isolate the content of the body 2 from the external environment during storage or idle periods.

Since the device 1 can be stored for long periods, it is advantageous to sterilize it at the end of its manufacture, so as to prevent, among other possibilities, any bacterial growth, during these storage periods, on the porous or micro-porous elements that form them. Advantageously, this sterilizing can be done with a dose of beta or gamma radiation of about 1 to 2 Mrad. This sterilization by radiation can be done on the device 1 shielded by a strippable type of impervious packing.

What is claimed is:

1. An individual, portable water-treatment device comprising as water-treatment components a first filtering device, for the filtering of suspended matter, a charge of absorbent, a charge of ion exchangers and a second filtering device for filtering micro-organisms, wherein said components are contained in an elongated enclosure comprising a confining wall, an inlet end and an outlet end, a first closure at the inlet end provided with an inlet for water to be treated and, at its outlet end a second closure provided with an outlet for treated water, and means for imperviously closing the outlet during off periods and opening the outlet during on periods and wherein the first filtering device is in a chamber of the enclosure adjacent to the inlet end closure and separated from the rest of the enclosure containing the charges and the second filtering device by a impervious partition wall fixed to the confining wall of the elongated enclosure and provided with means defining a hole and means fixed at the hole for closing the hole imperviously during off periods and for permitting opening of the hole during on periods.

2. A treatment device according to claim 1 wherein the first and second filtering devices comprise pleated membrane filtering cartridges.

3. A treatment device according to claim 2 wherein the filtering cartridge of the second filtering device comprises two superimposed filtering membranes with different porosity values.

4. A treatment device according to claim 1 wherein the charge of absorbent and the charge of ion exchangers are in a ratio, by volume, or 1:1 with respect to each other.

5. A treatment device according to claim 1 wherein the ion exchangers comprise anion exchanging resins and cation exchanging resins in a ratio, by volume, of 1.5:1 with respect to each other.

6. A treatment device according to claim 1 provided with means for opening the outlet end activatable when a receptacle that collects treated water is fixed to the outlet end.

7. A treatment device according to claim 6, wherein the means for opening the outlet end is a valve that is kept closed by a spring, and a thrusting washer for exerting opening force on the valve when a receptacle is fixed to the outlet end.

8. A treatment device according to claim 1 wherein said partition wall is closed by a valve which is normally kept closed by a spring and which opens at a water pressure exerted upon it of about 30 to 50 mbars.

9. A treatment device according to claim 1 wherein said partition wall comprises, on the charges side, a recess, and is followed by a plate made of permeable material which entirely covers the recess.

10. A water-treatment device according to claim 1, wherein the elongated enclosure comprises an elongated confining wall closed at the outlet end by the second closure, the partition wall having a shoulder for closely fitting the elongated confining wall thereto at its opposite end, and the chamber being fitted to the partition wall.

11. A treatment device according to claim 10 which includes activatable air discharging means at the inlet closure.

12. A treatment device according to claim 10 which includes in the outlet end means defining a hole piercing the outlet end closure communicating with the external face of the outlet end closure and the exterior side of the enclosure to enable elimination of air and overflow water from an adfixed receptacle.

13. A water-treatment device according to claim 1, wherein said device is sterile.

14. A water-treatment device according to claim 1, wherein the elongated enclosure is of cylindrical form.

* * * * *